United States Patent
Dölling

Patent Number: 6,092,367
Date of Patent: Jul. 25, 2000

[54] METHOD AND APPARATUS FOR METERING THE INTRODUCTION OF A REDUCING AGENT INTO THE EXHAUST-GAS OR EXHAUST-AIR STREAM OF A COMBUSTION INSTALLATION

[75] Inventor: Winfried Dölling, Weissenbrunn, Germany

[73] Assignee: Siemens Aktiengesellschaft, Munich, Germany

[21] Appl. No.: 09/050,649

[22] Filed: Mar. 30, 1998

Related U.S. Application Data

[63] Continuation of application No. PCT/DE96/01769, Sep. 18, 1996.

[30] Foreign Application Priority Data

Sep. 29, 1995 [DE] Germany ............ 195 36 571

[51] Int. Cl.[7] .................................................. F01N 3/00
[52] U.S. Cl. ................................................ 60/274; 60/303
[58] Field of Search ......................... 60/274, 328, 303

[56] References Cited

U.S. PATENT DOCUMENTS

| | | | |
|---|---|---|---|
| 4,831,838 | 5/1989 | Nagai et al. ............ | 60/274 |
| 5,247,445 | 9/1993 | Miyano et al. ........... | 123/674 X |
| 5,341,641 | 8/1994 | Nakajima et al. ......... | 60/274 |
| 5,359,852 | 11/1994 | Curran et al. ........... | 60/274 |
| 5,367,875 | 11/1994 | Aboujaoude et al. ...... | 60/286 X |
| 5,483,946 | 1/1996 | Hamburg et al. ......... | 60/284 X |
| 5,576,970 | 11/1996 | Goto .................... | 364/528.09 X |
| 5,628,186 | 5/1997 | Schmelz ................. | 60/286 X |

FOREIGN PATENT DOCUMENTS

| | | |
|---|---|---|
| 0 498 598 A1 | 8/1992 | European Pat. Off. . |
| 33 37 793 C2 | 3/1988 | Germany . |
| 40 24 210 A1 | 2/1992 | Germany . |
| 43 15 278 A1 | 11/1994 | Germany . |

OTHER PUBLICATIONS

Patent Abstracts of Japan No. 43–46819.
International Publication No. 95/04878 (Keeler et al.), dated Feb. 16, 1995.
Patent Abstracts of Japan No. 01094924 (Sadao et al.), dated Apr. 13, 1989.

*Primary Examiner*—John E. Ryznic
*Attorney, Agent, or Firm*—Herbert L. Lerner; Laurence A. Greenberg

[57] ABSTRACT

The invention relates to a method and an associated apparatus for metering a quantity of a reducing agent introduced into the exhaust-gas or exhaust-air stream of a combustion installation, in particular an internal combustion engine, for the reduction of pollutants. The quantity of the reducing agent to be introduced is determined by way of a functional relationship. The functional relationship is determined from operation-relevant parameters of the combustion installation, the exhaust gas and, if appropriate, of a catalytic converter. The functional relationship is checked during the operation of the combustion installation and adapted to the current state and the current operating conditions of the combustion installation, the exhaust gas and, if appropriate, the catalytic converter.

21 Claims, 4 Drawing Sheets

METHOD AND APPARATUS FOR METERING THE INTRODUCTION OF A REDUCING AGENT INTO THE EXHAUST-GAS OR EXHAUST-AIR STREAM OF A COMBUSTION INSTALLATION

CROSS-REFERENCE TO RELATED APPLICATION

This is a continuation of International Application PCT/DE96/01769, filed Sep. 18, 1996 which designated the United States.

BACKGROUND OF THE INVENTION

Field of the Invention

The invention relates to a method for metering a quantity of a reducing agent introduced into an exhaust-gas or exhaust-air stream of a combustion installation. A quantity of reducing agent is introduced into the exhaust-gas. The quantity of reducing agent is set using a functional relationship on a basis of operation-relevant parameters of a combustion installation, an exhaust gas and/or a pollution reducing catalytic converter. The functional relationship is further adapted to a current state of the pollution reducing catalytic converter. In addition, the invention relates to an apparatus for determining and introducing the quantity of reducing agent. German Published, Non-Prosecuted Patent Application DE 43 15 278 A1, correspondingto U.S. Pat. No. 5,628,186, describes a method and an associated apparatus for metering a reducing agent into an exhaust gas of an internal combustion engine containing nitrogen-oxide. The quantity of reducing agent introduced into the exhaust-gas stream is set by a control unit as a function of operation-relevant parameters. If optimized metering of the quantity of the reducing agent is performed, complete catalytic conversion of the nitrogen oxides is achieved by a catalytic converter without using excess reducing agent.

The operation-relevant parameters of an internal combustion engine such as control-rod travel, an air charging pressure or an engine speed are converted into a reducing-agent rate by the control unit with the aid of a predetermined functional relationship in the form of a characteristic map stored in the control unit. The operation-relevant parameters of the catalytic converter such as catalytic activity or storage capacity are likewise stored in the control unit and additionally used to calculate the reducing-agent rate. The aging of the catalytic converter is taken into account by modifying the operation-relevant parameters of the catalytic converter in accordance with aging curves determined in laboratory tests. The aging curves have a direct relationship to the time of operation of the internal combustion engine. A change in the functional relationship of the internal combustion engine due to aging, wear or changed operation conditions is not taken into account by the method presented in the German patent application.

German Patent DE 33 37 793 C2 also describes a method for metering a reducing agent into a nitrogen-oxide-containing exhaust gas of a combustion installation. Aging of the catalytic converter used to break down the nitrogen oxides is compensated for by a corresponding displacement of a stoichiometry curve which describes the relationship between the nitrogen oxide and the reducing-agent concentration.

In the case of both methods, however, a non-optimum quantity of reducing agent is metered in if the characteristics of the internal combustion engine or of the combustion installation including the catalytic converter, which are used to determine the functional relationship between the operation-relevant parameters and the quantity of reducing agent to be metered, change in an unforeseeable manner.

SUMMARY OF THE INVENTION

It is accordingly an object of the invention to provide a method and an apparatus for metering the introduction of a quantity of a reducing agent into the exhaust-gas or exhaust-air stream of a combustion installation which overcome the above-mentioned disadvantages of the prior art devices and methods of this general type, in which optimized metering of the quantity of reducing agent is ensured for breaking down pollutants, even given unforeseeable changes in the characteristics of the combustion installation due to aging or wear.

With the foregoing and other objects in view there is provided, in accordance with the invention, a method for metering a quantity of a reducing agent introduced into an exhaust-gas or exhaust-air stream of a combustion installation, which includes: introducing a quantity of reducing agent into at least one of an exhaust-gas and an exhaust-air stream, the quantity of reducing agent being set using a functional relationship based on operation-relevant parameters of at least two of a combustion installation, an exhaust gas and a pollution reducing catalytic converter; adapting the functional relationship to a current state of the pollution reducing catalytic converter; checking the functional relationship during operation of the combustion installation; and adapting the functional relationship to a current operating condition of the combustion installation and a current state of the combustion installation as the function relationship is also modified by the operational parameters of the combustion installation.

In contrast to the prior art, the method according to the invention permits, in the establishment of an optimized quantity of reducing agent introduced, determination of and allowance for variables which go beyond the traditional operation-relevant parameters. These additional variables include, inter alia, the state of aging, the state of wear and other unusual operating conditions. Account is thereby taken of the fact that the functional relationship, used to determine an optimum quantity of reducing agent, between the operation-relevant parameters and the quantity of reducing agent to be metered, e.g. in the form of a characteristic curve or characteristic map, cannot be determined statically or beforehand in a laboratory test but, in the practical operation of combustion installations, has a dynamic character which needs to be checked and redetermined at regular intervals.

For the practical operation of combustion installations over many years, the method according to the invention thus represents a self-adapting method, which is to a large extent matched to the current and actual operating conditions, for the operation of combustion installations, as a result of which a favorable consumption of reducing agent and an optimum operating point for the operation of the combustion installation are established by virtue of the optimized quantity of reducing agent.

The checking and adapting of the functional relationship can now, on the one hand, be performed manually and as required (e.g. when the combustion installation is modified) or can be carried out automatically at periodic intervals by additional units integrated into the combustion installation system.

In addition to the operation-relevant parameters which are already generally taken into account, current state variables (i.e. aging, wear and tear, etc.) of the combustion installation and current operating conditions (i.e. load) of the combustion installation are taken into account. A representation of the combustion installation as an overall system is formed, which takes into account, when determining the optimum quantity of reducing agent to be introduced, all the factors to be taken into account for the operation of the combustion installation.

The method according to the invention analyzes itself by regular checking and adapting itself and thus does not remain in a functional relationship which only applies to a defined and general hypothetical state or one postulated according to the time in operation of the combustion installation.

According to the invention, the adaptation of the functional relationship can, on the one hand, be carried out by the use of correction factors. In the simplest case of a characteristic curve characterized by a particular input variable and by the quantity of reducing agent as the output variable, it is possible, by introducing a correction factor, to increase or decrease the initial value assigned to each input variable throughout by a correction factor.

In the case of a more complex functional relationship, individual parameters and weightings of the functional equation of the characteristic curves can be altered individually or cumulatively. In analogous fashion, separate or cumulative adaptation of the relations or functional components of the overall equation system associated with the individual input variables is performed in the adaptation of a characteristic map.

In the simplest case of a functional relationship encompassing just one input variable, it is possible, for example, for a displacement of the characteristic curve describing the functional relationship to take place by the introduction of a correction factor in the form of an additive or subtractive supplement.

Another feature of the invention is to perform the adaptation of the functional relationship with the aid of numerical methods. In the simplest case of a characteristic curve again encompassing a single input variable, it is possible, for example, for the initial point and final point of a region, which is, for example, parabolic, of the characteristic curve to be used for a new, corrective characteristic curve as well, while new intermediate function values are determined between the initial and the final region of the initial characteristic curve (i.e. by interpolation). In a similar manner, suitable numerical methods or multiple interpolations would have to be carried out in the case of multi-dimensional characteristic curves or characteristic maps.

To adapt the functional relationship in accordance with the method according to the invention, it can furthermore be advantageous to employ a multiplicity of mathematical methods including, for example, a combination of numerical methods with a simple correction factor determination.

In a first variant, one possibility for the adaptation of the functional relationship by the method according to the invention advantageously begins with the detection of the pollutant concentration in the exhaust-gas or exhaust-air stream of the combustion installation. Sensors are used to determine whether the pollutant concentration is within or outside a pollutant tolerance range. If the pollutant tolerance range is exceeded or undershot, the quantity of reducing agent supplied is automatically increased or decreased by a particular correction factor. To avoid an excessive pollutant concentration, the quantity of reducing agent is, for example, increased 1.1 times.

The correction factor is then also used to adapt the functional relationship for determining the quantity of reducing agent to be supplied, thereby eliminating the incorrect position of the functional relationship that caused the excessive pollutant concentration.

Finally, the pollutant concentration in the exhaust-gas or exhaust-air stream is determined once again and a further correction of the quantity of reducing agent introduced by the use of a new correction factor is performed if an excessive or reduced pollutant value reoccurs. The process being followed once again by the adaptation of the functional relationship by use of the correction factor.

The process described is repeated in a self-consistent manner until the pollutant concentration in the exhaust-gas or exhaust-air stream is within the permissible pollutant tolerance range. The continuous adaptation of the functional relationship by the one-off or repeated use of correction factors is associated with this.

The result is an optimized quantity of reducing agent introduced and a new, adapted position of the functional relationship corresponding to the actual circumstances.

In accordance with an added feature of the invention, there is the step of using a characteristic curve or characteristic map for deriving the functional relationship.

In accordance with another feature of the invention, there is the step of performing the checking and adapting steps of the functional relationship as required.

In accordance with an additional feature of the invention, there is the step of performing automatically the checking and adapting steps of the functional relationship.

In accordance with a further added feature of the invention, there is the step of performing the automatic checking and adapting steps at periodic intervals.

In accordance with a further additional feature of the invention, there is the step of performing the adapting of the functional relationship step with a correction factor.

In accordance with a yet another feature of the invention, there is the step of performing the adapting of the functional relationship step with the correction factor as an additive or subtractive supplement to the operation-relevant parameters.

In accordance with yet another added feature of the invention, there is the step of performing the adapting of the functional relationship step with an aid of a numerical method.

In accordance with yet another feature of the invention, there is the step of performing the adapting of the functional relationship step with the aid of an interpolation.

In accordance with an additional feature of the invention, there are the steps of: a) detecting a pollutant concentration in at least one of the exhaust-gas and the exhaust-air stream; b) ascertaining if a pollutant tolerance range has been complied with; c) varying the quantity of the reducing agent by a correction factor if the pollutant concentration is not within the pollutant tolerance range; d) adapting the functional relationship for determining a respective quantity of the reducing agent to be supplied by the correction factor; and e) repeating steps a)–d) until a measured value of the pollutant concentration is detected to be in compliance with the pollutant tolerance range.

In a second variant of the method according to the invention, the quantity of reducing agent supplied is increased beyond the actually required amount of reducing agent, giving rise to a defined reducing-agent slip (i. e. excess of reducing agent), which is detected and controlled by suitable sensor elements, e.g. an $NH_3$ sensor.

On the basis of the state of the reducing-agent slip, an optimum operating point of the combustion installation is calculated by using the reducing-agent slip variable, the current state variables and the operation-relevant parameters. If the calculated operating point differs from the actual operating point of the combustion installation (before the production of the reducing-agent slip), an adaptation of the functional relationship is performed in order to achieve an optimized operating point of the combustion installation once the produced reducing-agent slip has been eliminated.

Notwithstanding the proposed variants of the method according to the invention, an adaptation of the functional relationship can be performed as described by the various methods or combinations of methods.

In accordance with a further additional feature of the invention, there is the step of providing a safety or a monitoring function for controlling a prevention and an allowance of the adaptation of the functional relationship. In general, the adaptation of the functional relationship by safety and monitoring functions of the overall operating behavior of the combustion installation is accompanied by safety and monitoring functions in order to ensure a stable and controlled operating situation of the combustion installation even during adaptation.

As already explained, the method according to the invention encompasses not only the current state variables (e.g. aging or wear) and the current operating conditions (e.g. unusual load situations) but also conventional operation-relevant parameters. Examples of operation-relevant parameters of the internal combustion engine which are taken into account are the air mass flow, the accelerator pedal position, the boost pressure and the engine speed.

The operation-relevant parameters of the exhaust gas, its temperature, pressure, mass flow and pollutant concentration are acquired, inter alia. Among the operation-relevant parameters of a catalytic converter used for pollution reduction are its temperature, the catalytic activity, the weight of the catalytically active mass, the geometry, the heat transfer characteristics and the specific temperature-dependent storage capacity for the reducing agent.

In accordance with another feature of the invention, there are the steps of: a) increasing the quantity of reducing agent supplied resulting in a production of a defined reducing-agent slip; b) calculating an operating point of the combustion installation by using the defined reducing-agent slip, the current state variables and the operation-relevant parameters; and c) adapting the functional relationship to determine the quantity of the reducing agent to be supplied if the calculated operating point differs from an instantaneous operating point determined by one of the characteristic curve and the characteristic map.

In accordance with an additional feature of the invention, there is the step of detecting and monitoring the reducing-agent slip with a sensor element.

In accordance with a further added feature of the invention, there is the step of detecting and monitoring the reducing-agent slip with a $NH_3$ sensor.

In accordance with yet another feature of the invention, there is the step of providing an internal combustion engine as the combustion installation and the operation-relevant parameters include at least one of an air mass flow, an accelerator pedal position, a boost pressure and an engine speed of the internal combustion engine.

In accordance with yet another added feature of the invention, there is the step of using at least one of a temperature, a pressure, a mass flow, and a pollutant concentration of the exhaust gas as the operation-relevant parameters of the exhaust gas.

In accordance with yet an additional feature of the invention, there is the step of using at least one of a temperature, a catalytic activity, a weight of the catalytically active mass, a geometry, a heat transfer and a specific storage capacity for the reducing agent of the catalytic converter as operation-relevant parameters of the catalytic converter.

In accordance with an added feature of the invention, there is the step of purging the catalytic converter of the reducing agent by blue-flame burning before start-up of the combustion installation. To produce a defined initial state before putting into operation the combustion installation with a catalytic converter, it is advantageous if the catalytic converter is purged of any residual reducing agent by introducing the exhaust gases of a blue-flame burner.

With the foregoing and other objects in view there is provided, in accordance with the invention, an apparatus for metering an introduction of a reducing agent into at least one of an exhaust-gas and exhaust-air stream, including:

a combustion installation producing an exhaust gas;

a catalytic converter disposed downstream from the combustion installation for receiving the exhaust gas and reducing a pollution content of the exhaust gas; sensor elements to determine a current state, a current operating condition and operation-relevant parameters of at least two of the combustion installation, the exhaust gas and the catalytic converter; a central unit connected to the sensor elements to determine a quantity of reducing agent to be introduced into the exhaust gas, the quantity of the reducing agent set on a basis of a functional relationship based on operation-relevant parameters of at least two of the combustion installation, the exhaust gas and the catalytic converter, and to check and adapt the functional relationship in regards to the current operating condition of the combustion installation, to the current state of the catalytic converter and to the current state of the combustion installation by modifying the functional relationship with regard to the operation-relevant parameters of the combustion installation as a function of measured values detected by the sensor elements.

In accordance with an added feature of the invention, includes a reducing agent supply container, and the central unit is used for overall control and monitoring of the combustion installation, the catalytic converter, the reducing agent supply container and other components belonging to the combustion installation.

In accordance with another feature of the invention, the combustion installation is an internal combustion engine.

In accordance with a concomitant feature of the invention, the central unit uses a stored characteristic curve or characteristic map for determining the functional relationship.

The apparatus according to the invention for metering the quantity of a reducing agent to be introduced into the exhaust-gas or exhaust-air stream of combustion installations, in particular for carrying out the method according to the invention, is distinguished, inter alia, by sensor elements which determine the current state and the current operating conditions of the overall combustion installation and, in particular, of the internal combustion engine, the exhaust gas and the catalytic converter in addition to the operation-relevant parameters that are usually determined.

In addition, the apparatus according to the invention has a central unit which is connected to the sensor elements and in which the quantity of reducing agent to be introduced can be determined by calculation with the aid of the functional relationship. In particular, the central unit also makes possible adaptation and checking of the functional relationship as a function of the measured values detected by the sensor elements, whereby wear parameters or aging parameters noted by the sensor elements are taken into account in the manner described.

In addition, it is advantageous if the central unit is used for the overall control and monitoring of the internal combustion engine, the catalytic converter, the supply of reducing agent, other units belonging to the combustion installation and controls the safety and monitoring functions which have also to be taken into account in the adaptation of the functional relationship.

Other features which are considered as characteristic for the invention are set forth in the appended claims.

Although the invention is illustrated and described herein as embodied in a method and an apparatus for metering the introduction of a reducing agent into the exhaust-gas or exhaust-air stream of a combustion installation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
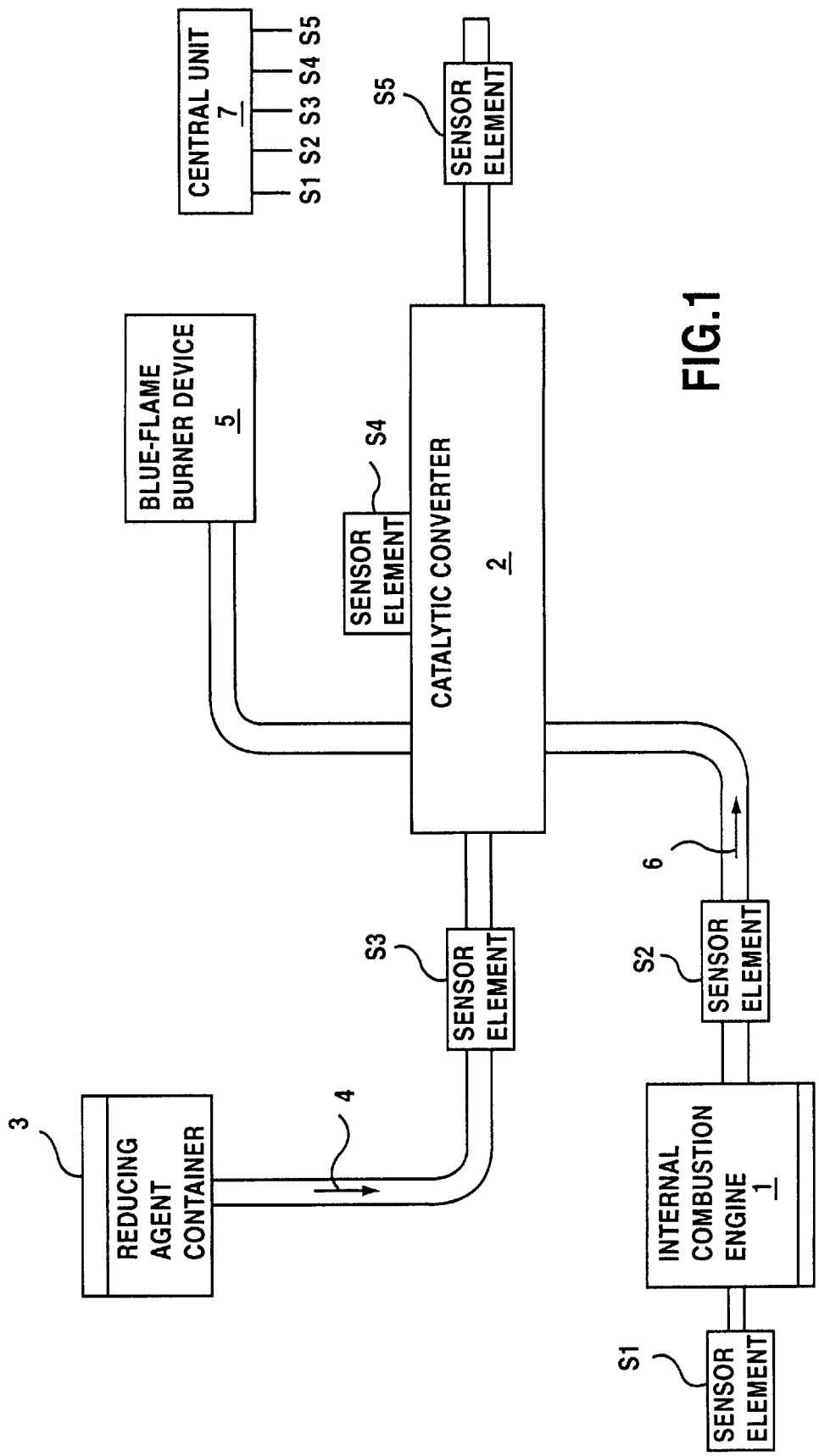
FIG. 1 is a block circuit diagram of an apparatus according to the invention.

Referring now to the figures of the drawing in detail and first, particularly, to FIG. 1 thereof, there is shown an illustrative overall system of a combustion installation with an internal combustion engine 1. Exhaust gases 6 from the internal combustion engine 1 are introduced into a catalytic converter 2 for cleaning. The catalytic converter 2 additionally has introduced into it a reducing agent 4 stored in a reducing-agent container 3 and, when required, waste gases of a blue-flame burner device 5. Sensor elements $S_1v$–$S_5$ are fitted at various points in the overall installation to determine operation-relevant parameters and to determine the current states and current operating conditions of the overall installation. Adaptation of a functional relationship is performed by a central unit 7, which for control purposes is connected to all system components and, inter alia, acquires and processes measured values determined by the sensor elements $S_1$–$S_5$.

Figure 6:
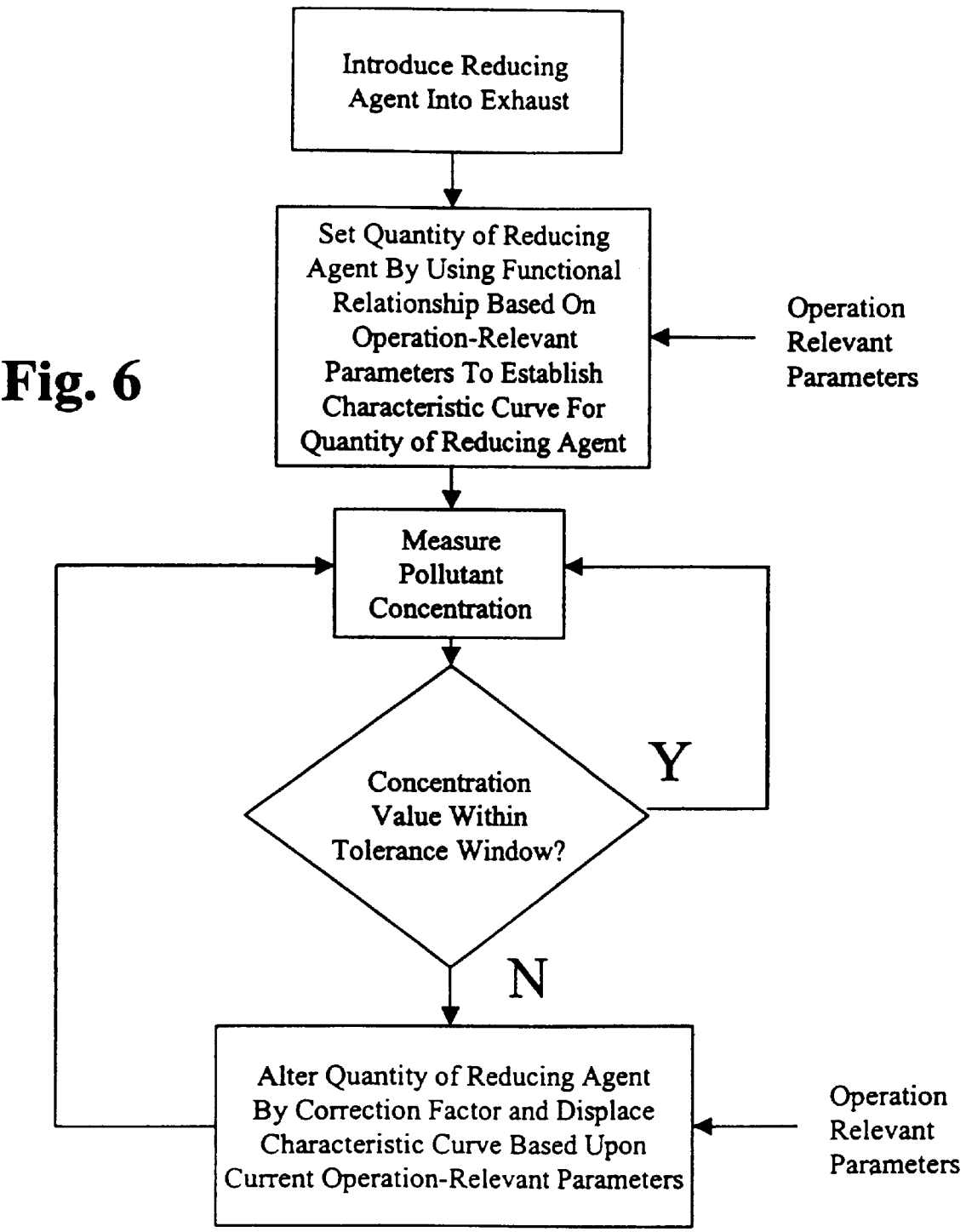
FIG. 6 is a flow chart of the method according to the invention.

A first variant of the method according to the invention will now be described with reference to FIGS. 2 and 6. On the basis of a simple, model-type determination of a pollutant concentration 20 by use of a single parameter 21 on the abscissa, the concentration values K of the pollutant concentration 20 are established. First of all, the concentration value $K_1$, which lies above a tolerance window 8 for a permissible pollutant range, is ascertained. This shows that too little reducing agent has been added as the pollution concentration exceeds the threshold range.

Figure 3:
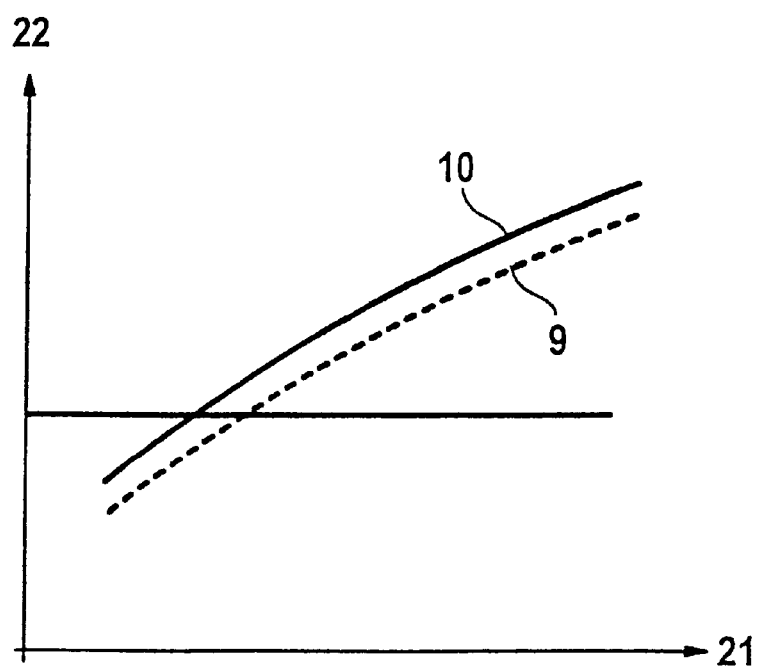
FIG. 3 is a graph of an adaptation of a characteristic curve by displacement.

In the next method step, a quantity 22 of reducing agent is altered and thus increased by a correction factor (e.g. 1.2) as shown in FIG. 3. The selected correction factor is also involved in the displacement of the characteristic curve for determining the optimized quantity 22 of reducing agent, and thus—starting from the original dashed initial characteristic curve 9—an adapted characteristic curve 10 displaced by the correction factor is obtained as shown in FIG. 3.

The pollutant concentration 20 is then measured again and it is observed that the concentration value $K_2$ is within the tolerance window 8. The adapted characteristic curve 10 shown in FIG. 3 is now taken as a starting point for future operation of the combustion installation.

Figure 2:
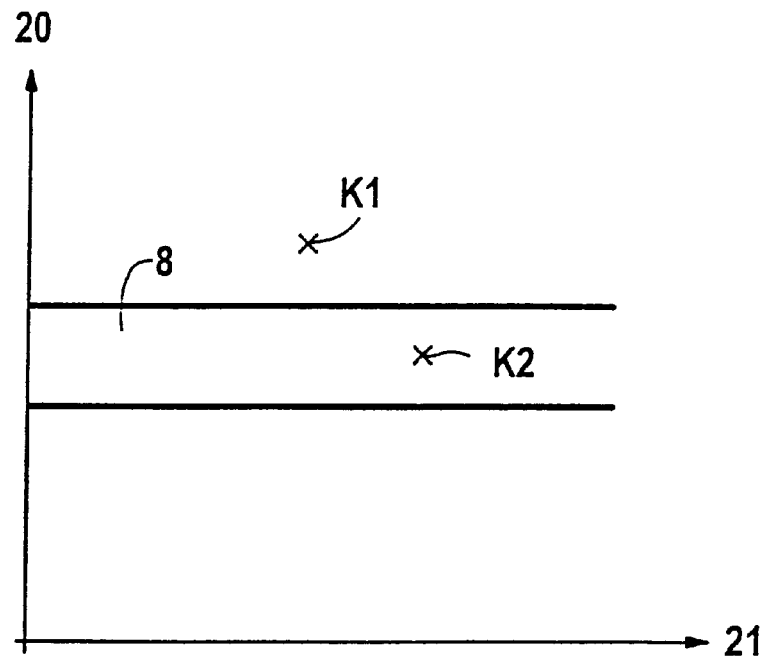
FIG. 2 is a graph illustrating a first variant of a method according to the invention.

The simple representation given in FIGS. 2 and 3 of a first variant of the method according to the invention was based on simple characteristic curves formed of a single variable. The described adaptation processes by use of a correction factor are transferable mutatis mutandis (with the necessary changes having been made) to the multi-dimensional characteristic curves and maps.

Figure 4:
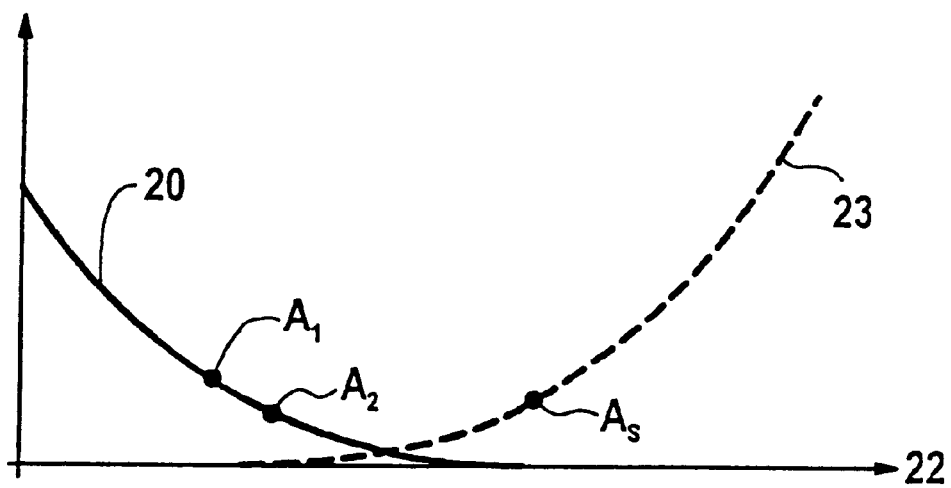
FIG. 4 is a graph of a second variant of the method.
Figure 5:
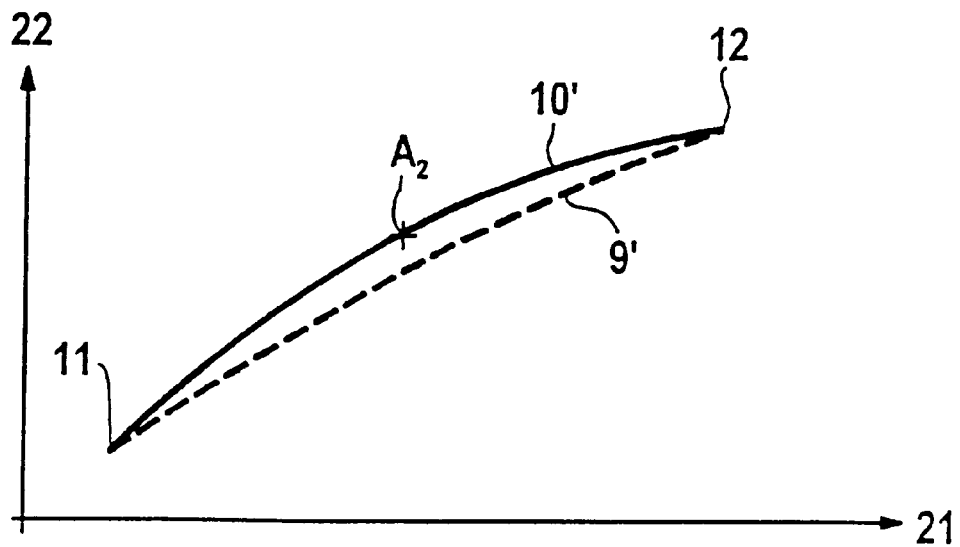
FIG. 5 is a graph of the adaptation of the characteristic curve by interpolation.

A second variant of the method according to the invention is illustrated in FIGS. 4 and 5. The combustion installation is first of all operated at operating point Al as shown in FIG. 4.

By increasing the quantity 22 of reducing agent, while monitoring the increase by a suitable sensor element (e.g. a $NH_3$ sensor), a reducing-agent slip 23 is produced with a simultaneous reduction in the pollutant concentration 20, the operating point $A_s$ is attained. Taking this operating point $A_s$ as a basis, calculations are carried out using the reducing-agent slip 23, the operation-relevant parameters, the current state variables and the current operating conditions. The calculations result in an optimized quantity of reducing agent and hence an optimized operating point $A_2$ for the operating state before the correction run.

In the simplest case, the quantity 22 of reducing agent present in the slip state is corrected by an empirical factor, the optimized quantity 22 of reducing agent for the operating state before the correction run thereby being determined. This is performed with the assumption of a small excess of reducing agent in relation to the quantity 22 of reducing agent.

In the present case, the optimized operating point $A_2$ differs from the original operating point $A_1$. It is therefore necessary to adapt an initial characteristic curve 9' used for operation at the original operating point $A_1$ in accordance with FIG. 5. In the case of FIG. 5, this is accomplished by adopting an initial point 11 and a final point 12 of the initial characteristic curve 9' and calculating a new, adapted characteristic curve 10' which passes through the operating point $A_2$ (e.g. using an interpolation method to determine intermediate values between the initial point 11, the operating point $A_2$ and the final point 12).

The combustion installation is subsequently operated at operating point $A_2$ and the quantity of reducing agent is determined in accordance with the adapted characteristic curve 10' which, of course, also takes into account current state variables and current operating variables of the combustion installation.

I claim:

1. A method for metering a quantity of a reducing agent introduced into an exhaust-gas or exhaust-air stream of a combustion installation, which comprises:
   introducing a quantity of reducing agent into at least one of an exhaust-gas and an exhaust-air stream, setting the quantity of the reducing agent by using a functional relationship based on operation-relevant parameters of at least two of a combustion installation, an exhaust gas and a pollution reducing catalytic converter;
   adapting the functional relationship to a current state of the pollution reducing catalytic converter;
   checking the functional relationship during operation of the combustion installation; and
   adapting the functional relationship to a current operating condition of the combustion installation and to a current state of the combustion installation as the functional relationship is also modified with respect to the operational parameters of the combustion installation.

2. The method according to claim 1, which comprises using at least one of a characteristic curve and characteristic map for deriving the functional relationship.

3. The method according to claim 1, which comprises performing the checking and adapting steps of the functional relationship as required.

4. The method according to claim 1, which comprises performing automatically the checking and adapting steps of the functional relationship.

5. The method according to claim 4, which comprises performing the automatic checking and adapting steps at periodic intervals.

6. The method according to claim 1, which comprises performing the adapting of the functional relationship step with a correction factor.

7. The method according to claim 6, which comprises performing the adapting of the functional relationship step with the correction factor as an additive or subtractive supplement to the operation-relevant parameters.

8. The method according to claim 1, which comprises performing the adapting of the functional relationship step with an aid of a numerical method.

9. The method according to claim 8, which comprises performing the adapting of the functional relationship step with the aid of an interpolation.

10. The method according to 1, which comprises:
    a) detecting a pollutant concentration in at least one of the exhaust-gas and the exhaust-air stream;
    b) ascertaining if a pollutant tolerance range has been complied with;
    c) varying the quantity of the reducing agent by a correction factor if the pollutant concentration is not within the pollutant tolerance range;
    d) adapting the functional relationship for determining a respective quantity of the reducing agent to be supplied by the correction factor; and
    e) repeating steps a)–d) until a measured value of the pollutant concentration is detected to be in compliance with the pollutant tolerance range.

11. The method according to claim 1, which comprises:
    a) increasing the quantity of the reducing agent supplied for resulting in a production of a defined reducing-agent slip;
    b) calculating an operating point of the combustion installation by using the defined reducing-agent slip, the current state variables and the operation-relevant parameters; and
    c) adapting the functional relationship for determining the quantity of the reducing agent to be supplied if the calculated operating point differs from an instantaneous operating point determined by one of the characteristic curve and the characteristic map.

12. The method according to claim 11, which comprises detecting and monitoring the reducing-agent slip with a sensor element.

13. The method according to claim 11, which comprises detecting and monitoring the reducing-agent slip with a $NH_3$ sensor.

14. The method according to claim 1, which comprises providing an internal combustion engine as the combustion installation and including at least one of an air mass flow, an accelerator pedal position, a boost pressure and an engine speed of the internal combustion engine in the operation-relevant parameters.

15. The method according to claim 1, which comprises using at least one of a temperature, a pressure, a mass flow, and a pollutant concentration of the exhaust gas as the operation-relevant parameters of the exhaust gas.

16. The method according to claim 1, which comprises using at least one of a temperature, a catalytic activity, a weight of the catalytically active mass, a geometry, a heat transfer and a specific storage capacity for the reducing agent of the catalytic converter as the operation-relevant parameters of the catalytic converter.

17. The method according to claim 1, which comprises purging the catalytic converter of the reducing agent by blue-flame burning before start-up of the combustion installation.

18. An apparatus for metering an introduction of a reducing agent into at least one of an exhaust-gas and exhaust-air stream, comprising:
    a combustion installation producing an exhaust gas;
    a catalytic converter disposed downstream from said combustion installation for receiving the exhaust gas and reducing a pollution content of the exhaust gas;
    sensor elements for determining a current state, a current operating condition, and operational-relevant parameters of at least two of said combustion installation, the exhaust gas and said catalytic converter; and;
    a central unit connected to said sensor elements for determining a quantity of reducing agent to be introduced into the exhaust gas, the quantity of the reducing agent set on a basis of a functional relationship based on operation-relevant parameters of at least two of said combustion installation, the exhaust gas and said catalytic converter, and for checking and adapting the functional relationship in regards to the current operating condition of said combustion installation, to the current state of said catalytic converter and to the current state of said combustion installation by changing the functional relationship with respect to the operation-relevant parameters of said combustion installation as a function of measured values detected by said sensor elements, the current state of the combustion installation including a time-relevant parameter and a use-relevant parameter.

19. The apparatus according to claim 18, including a reducing agent supply container, said central unit used for overall control and monitoring of said combustion installation, said catalytic converter, said reducing agent supply container and other components belonging to said combustion installation.

20. The apparatus according to claim 18, wherein said combustion installation is an internal combustion engine.

21. The apparatus according to claim 18, wherein said central unit uses at least one of a stored characteristic curve and a characteristic map for determining the functional relationship.

* * * * *